United States Patent
Knox et al.

(10) Patent No.: US 9,910,714 B2
(45) Date of Patent: Mar. 6, 2018

(54) SCRIPTABLE DYNAMIC LOAD BALANCING IN COMPUTER SYSTEMS

(71) Applicant: Advanced Micro Devices, Inc., Sunnyvale, CA (US)

(72) Inventors: Kent F. Knox, Austin, TX (US); Jian Liu, Austin, TX (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 0 days.

(21) Appl. No.: 14/753,253

(22) Filed: Jun. 29, 2015

(65) Prior Publication Data

US 2016/0378568 A1    Dec. 29, 2016

(51) Int. Cl.
G06F 9/46 (2006.01)
G06F 9/50 (2006.01)

(52) U.S. Cl.
CPC .................. G06F 9/5083 (2013.01)

(58) Field of Classification Search
None
See application file for complete search history.

(56) References Cited

U.S. PATENT DOCUMENTS

| | | | | |
|---|---|---|---|---|
| 6,097,886 A | * | 8/2000 | Dave | G06F 8/10 703/23 |
| 8,700,773 B2 | * | 4/2014 | Caplan | G06F 9/505 709/217 |
| 2009/0094611 A1 | * | 4/2009 | Danne | G06F 9/5033 718/105 |
| 2009/0204693 A1 | * | 8/2009 | Andreev | G06F 8/24 709/221 |
| 2012/0084788 A1 | * | 4/2012 | Sakamoto | G06F 9/5083 718/105 |

* cited by examiner

*Primary Examiner* — Gregory A Kessler
(74) *Attorney, Agent, or Firm* — Park, Vaughan, Fleming & Dowler LLP (57) ABSTRACT

The described embodiments include a system for executing a load using a first processor and a seond processor in a computer system. During operation, a load balancer executing on the first processor obtains one or more attributes of a load to be executed on the computer system. Next, the load balancer applies a set of configurable rules to the one or more attributes to select a processor from the first and second processors for executing the load. Finally, the system executes the load on the selected processor.

17 Claims, 4 Drawing Sheets

302 {
```
local tableOfThresholds = {
    s = { m = 64, n = 64, k = 64, sizeof=4,  psize = 64000000 },
    d = { m = 64, n = 64, k = 64, sizeof=8,  psize = 343000000 },
    c = { m = 64, n = 64, k = 64, sizeof=8,  psize = 8000000 },
    z = { m = 64, n = 64, k = 64, sizeof=16, psize = 8000000 },
}
```

304 {
```
local function tern( cond, true_clause, false_clause )
    if cond then return true_clause else return false_clause end
end
```

306 {
```
function heuristic( transa, transb, m, n, k, alpha_real, alpha_imag, lda, ldb, beta_real,
    beta_imag, ldc, precision )
```

308 {
```
local myThreshold = tableOfThresholds[ precision ]

local maxAllocMiB = acml_getDeviceMaxMemoryAlloc( 1 )
local ka = tern( (transa == 'n'), k, m )
local kb = tern( (transb == 'n'), n, k )

local AMatMiB = bit32.rshift( lda * ka * myThreshold.sizeof, 20 )
local BMatMiB = bit32.rshift( ldb * kb * myThreshold.sizeof, 20 )
local CMatMiB = bit32.rshift( ldc * n * myThreshold.sizeof, 20 )
```

310 {
```
if( (AMatMiB > maxAllocMiB) or (BMatMaiB > maxAllocMiB) or (CMatMiB >
    maxAllocMiB) ) then
        return false
elseif( (AMatMiB + BMatMiB + CMatMiB) > acml_getDeviceGlobalMemorySize(1) )
    then
        return false
end
```

312 {
```
if( (alpha_real == 0) and (alpha_imag == 0) ) then
        return false
end
```

314 {
```
if( (m > myThreshold.m) and (n > myThreshold.n) and (k > myThreshold.k) ) then
        local psize = m * n * k
        if(psize > myThreshold.psize) then
                return true
        end
end return false
```
end

SCRIPTABLE DYNAMIC LOAD BALANCING IN COMPUTER SYSTEMS

BACKGROUND

Field

The described embodiments relate to computer systems. More specifically, the described embodiments relate to techniques for performing scriptable dynamic load balancing in computer systems.

Related Art

Some computer systems support load balancing. Generally, load balancing involves distributing compute workloads or "loads," such as tasks, operations, sets of one or more instructions, functions/methods, etc., to multiple processors (e.g., microprocessors, processor cores, compute units, application specific integrated circuits, embedded processors, etc.) to be performed thereon. For some computer systems, called "homogeneous-processing systems," in which the multiple processors have similar properties/characteristics and optimizations, techniques for load balancing have been well-studied and many implementations proposed. In other systems, called "heterogeneous-processing systems," in which the multiple processors include processors having different properties/characteristics and optimizations, techniques for efficiently load balancing are not as well-developed.

Generally, to improve the load-processing performance (efficiency, speed, etc.) of a heterogeneous-processing computer system, a load balancer may distribute the load among the multiple processors based on attributes of the load and/or characteristics of the processors. In some existing heterogeneous-processing computer systems, a load balancer performs "static" load balancing, for which a predetermined set of rules (e.g., rules that are hard-coded into hardware or firmware, etc.) are used by the load balancer to distribute the load among the processors in the computer system. In other existing heterogeneous-processing computer systems, a load balancer performs "dynamic" load balancing, for which loads are dynamically divided into multiple portions (blocks, packets, compute jobs, etc.), and each portion is assigned to a queue for a corresponding one of the multiple processors based on processor load, load type, etc. In such computer systems, the load balancer may assign additional portions of the load to the processor by placing these portions in the corresponding queue as space becomes available. As a result, faster processors may process more portions of the load, and slower processors may process fewer portions of the load.

Although using a load balancer to distribute loads can improve the load-processing performance of a heterogeneous-processing computer system, designers using load balancers face a tradeoff between adaptability and simplicity. For example, a load balancer that uses static load balancing, with the associated hard-coded rules, can be simpler to implement, but may not easily adapt to new types and arrangements of processors, types of loads, or computer system architectures. Conversely, a dynamic load balancer may more readily adapt to new types and arrangements of processors or computer system architectures and/or types of loads, but require significant time and resources to initially implement and maintain/update.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the described embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

The described embodiments include a heterogeneous-processing computer system that performs scriptable dynamic load balancing. Generally, a heterogeneous-processing computer system includes multiple heterogeneous processors. "Heterogeneous" processors include processors with different properties/characteristics and optimizations, such as with different architectures, instruction sets, functional blocks, processing circuits, and/or other differences. For example, in some embodiments, the heterogeneous processors include central processing unit(s) (CPUs), graphics processing unit(s) (GPUs), application specific integrated circuit(s) (ASICs), accelerated processing unit(s) (APUs) and/or other processors. In some embodiments, heterogeneous processors are optimized for corresponding types of operations (although some or all of the heterogeneous processors may perform some or all of the operations performed by others of the heterogeneous processors, albeit perhaps less efficiently, quickly, etc.). For example, a CPU may be optimized for low-latency scalar operation, a GPU may be optimized for parallel processing, an ASIC may be optimized for digital signal processing, etc.

For performing the "scriptable" dynamic load balancing, the described embodiments include a load balancer that executes a script that applies configurable rules to a load (the configurable rules including parameters, values, thresholds/limits, expressions, equations, etc.), and uses a result returned from executing the script to determine how to distribute the load among multiple heterogeneous processors in the computer system. More specifically, the load balancer acquires a script (e.g., loads a corresponding script file from a mass-storage device into a memory), information about the load, and/or one or more characteristics of processors in the computer system. The load balancer then, based at least in part on the information about the load and the characteristics of the processors, executes the script to generate at least one result indicating a distribution of the load (i.e., one or more processors for use in executing/performing the load).

In some embodiments, the load balancer also receives, as a result of executing the script, an indication of how to divide an original load into multiple separate portions (i.e., split the original load into a load and at least one additional load). In these embodiments, the result may indicate one or more of the processors to process each portion of the load. For example, the result may indicate that the load is to be split into a first portion (first load) and a second portion (second/additional load), and that the first portion is to be assigned to a first processor and the second portion is to be assigned to a second processor. The load balancer then causes the first and second portions to be processed on the corresponding processor.

In some embodiments, the script may be updated by receiving, acquiring, or otherwise obtaining a whole or partial update of and/or addition to the script dynamically (i.e., at runtime) or statically. For example, in some embodiments, the script (i.e. a file that contains the script) may be entirely replaced by a new version of the script. As another example, in some embodiments, one or more additional scripts may be used to add to, update/override, or otherwise be used in combination with an original script. For example, a script (and thus the configurable rules) may be updated to reflect changes in the number or characteristics of processors or amount of memory in the computer system and/or the computer architecture of the computer system (or software such as an operating system executing thereon). As another example, the script (and thus the configurable rules) may be updated to reflect different types of loads, such as loads associated with corresponding operations (mathematical operations, vector operations, etc.), data types (integer/floating point, arrays, vector data, etc.), memory access patterns, etc.

By using the script as described, the load balancing may be adapted to different arrangements of processors, computer system architectures, and types of loads. The described embodiments therefore enable simpler dynamic configuration of the load balancer in dividing and distributing various types of loads across various arrangements of processors in a variety of architectures without the complexity and computational overhead of existing dynamic load balancers and with more adaptability than existing static load balancers.

Computer System

Figure 1:
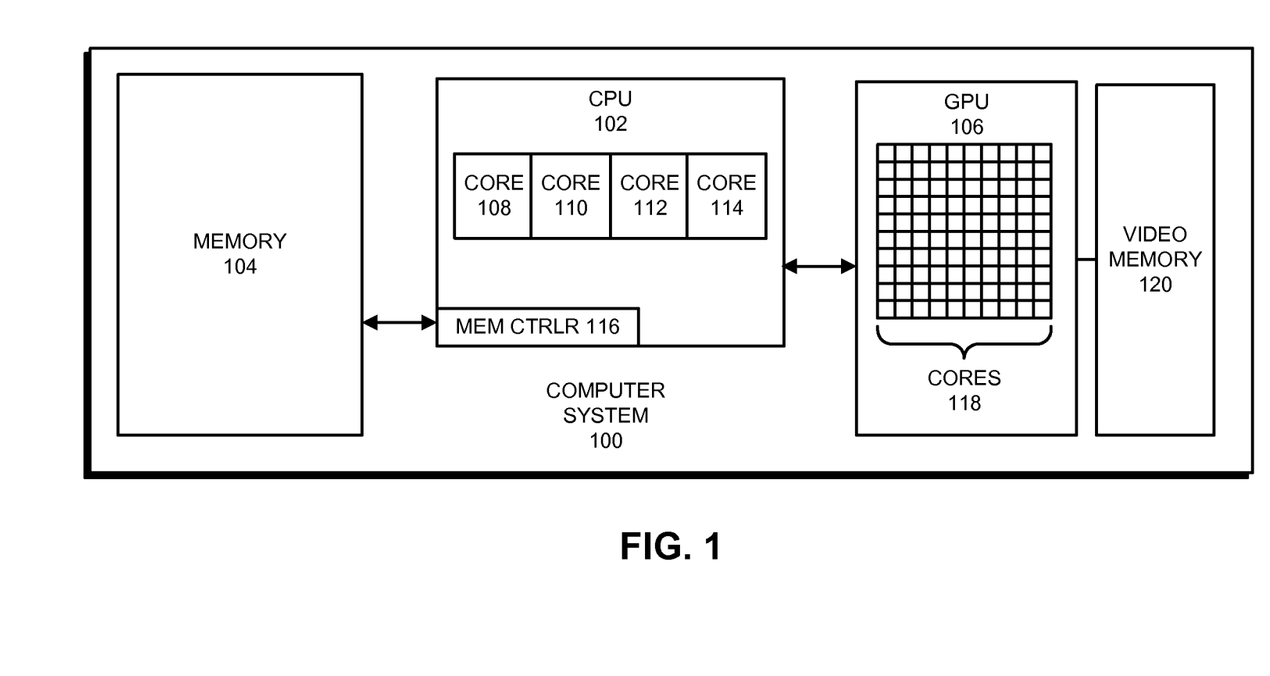
FIG. 1 presents a block diagram illustrating a computer system in accordance with some embodiments.

FIG. 1 presents a block diagram illustrating a computer system 100 in accordance with some embodiments. As can be seen in FIG. 1, computer system 100 includes central processing unit (CPU) 102, memory 104, and graphics processing unit (GPU) 106. CPU 102 is a functional block that performs computational operations. CPU 102 includes cores 108-114, each of which is a separate functional block that performs computational operations. For example, in some embodiments each of cores 108-114 is a microprocessor core, an embedded processor, an ASIC, etc. In some embodiments, some or all of cores 108-114 is optimized for certain operations. For example, one of cores 108-114 may be optimized for vector operations, SIMD operations, mathematical operations, etc. In these embodiments, one or all of cores 108-114 includes purpose-specific circuits, functional blocks, etc. that perform the corresponding operations more efficiently, more quickly, etc. than other cores without the purpose-specific circuits. Note that, although a given core may be optimized for certain operations, the given core may perform other operations, including some or all of the operations performed by others of cores 108-114 (and may perform these operations as efficiently as, fast as, etc. or better than other cores).

Memory 104 is a functional block that performs operations for storing and providing data and instructions to the functional blocks in computer system 100. Memory 104 comprises memory circuits such as one or more of DRAM, DDR SDRAM, and/or other types of memory circuits that are used for storing instructions and data for the other functional blocks, as well as control circuits for handling accesses of the instructions and data that are stored in the memory circuits. In some embodiments, memory 104 is the main memory in computer system 100. Although not shown in FIG. 1, computer system 100 also includes a mass-storage device such as a disk drive, a large non-volatile solid state memory, and/or another such device.

CPU 102 includes memory controller 116 ("MEM CTRLR 116"). Memory controller 116 is a functional block that performs operations for handling interactions between CPU 102 and memory 104. For example, memory controller 116 can handle reading data from and writing data to memory 104, control the memory circuits in memory 104, handle virtual address to physical address translation, etc.

GPU 106 is a functional block that performs computational operations. Cores 118 in GPU 106 include a set of processing circuits (compute units, pipelines, processor cores, etc.) that are configured to perform the computational operations (or portions thereof). Although, as described herein, cores 118 may perform various types of computational operations, in some embodiments, cores 118 are optimized for efficiently, quickly, etc. performing operations relating to graphics processing. For example, cores 118 may be configured to operate in parallel on different portions input video data to efficiently, quickly, etc. generate frames of video to be stored in video memory 120 and used to drive a display (not shown) of computer system 100.

In some embodiments, CPU 102 is used in combination with GPU 106 for processing loads (i.e., for performing various computing tasks, operations, functions, etc.). For example, a given load may be load balanced by distributing some or all of the load among one or more of cores 108-114 and/or one or more of cores 118 to more efficiently, more quickly, etc. process the load. (More efficiently, quickly, etc. than a system that processes the load on CPU 102 or GPU 106 alone.) The load balancing may be based on different characteristics and/or optimizations of CPU 102 and/or GPU 106 and/or the nature of the load, thereby providing the above-described improvements in efficiency, quickness, etc. for processing the load. For example, in some embodiments, portions of loads that include scalar processing may be directed to one of cores 108-114, which may be optimized for low-latency scalar processing, and portions of loads that include input data that can be processed in parallel (SIMD operations, vector operations, etc.) may be directed to GPU 106/cores 118, which may be optimized for parallel processing. As described above, in some embodiments, a script can be used for performing the distribution of loads among CPU 102 and GPU 106. In these embodiments, the script includes configurable rules (parameters, values, thresholds/limits, expressions, equations, etc.) that are used for determine how to distribute a load among CPU 102 and GPU 106 (i.e., among multiple heterogeneous processors).

In some embodiments, communication paths (that include one or more busses, wires, and/or connections) are coupled between the various functional blocks in computer system 100 (CPU 102, memory 104, etc.), as shown by arrow-headed lines between the elements. The communication paths are used to transmit commands, data, event notifications, and/or other information between the functional blocks.

Although computer system 100 is described with a particular arrangement of functional blocks, some embodiments include a different number and/or arrangement of functional blocks. For example, some embodiments have multiple CPUs 102 and/or GPUs 106. As another example, in some embodiments, GPU 106 is not located separately from CPU 102, but instead is included in CPU 102 (as with integrated graphics, systems-on-a-chip, Accelerated Processing Units, etc.). Generally, the described embodiments can use any number or arrangement of functional blocks that perform the operations herein described.

In addition, although computer system 100 is simplified for illustrative purposes, in some embodiments, computer system 100 includes additional functional blocks/elements for performing the operations herein described and/or other operations. For example, computer system 100 may include power controllers, batteries, media processors, communication mechanisms (e.g., a northbridge, a southbridge, etc.), peripheral devices, I/O devices, networking subsystems, display subsystems, etc.

Computer system 100 can be, or can be included in, any electronic device that performs computational operations. For example, computer system 100 can be, or can be included in, electronic devices such as desktop computers, laptop computers, wearable computing devices, tablet computers, smart phones, servers, network appliances, toys, audio-visual equipment, home appliances, controllers, etc., and/or combinations thereof.

Loads

Throughout this description, "loads" are described as being distributed to processors in computer system 100. Generally, a load includes any computational workload that can be performed by a processor (or other functional block). For example, for one type of load, a processor executes one or more instructions from program code, firmware, a routine, an operating system, etc. As another example, for another type of load, a processor receives one or more blocks, sections, etc. of data on which, or for which, one or more operations are to be performed. As yet another example, for another type of load, a processor receives a designation of a task or computational operation to be performed.

In some embodiments, loads are divisible, in that loads can be divided, split, or otherwise separated into one or more portions (which are also loads) that can be processed separately by one or more processors. For example, if an original load is processing elements of an array, some or all of the elements of the array may be split from the other elements and processed by different processors as separate and different loads. As another example, an original load that includes a section of program code may be split into (independent or dependent) portions that are executed separately by one or more processors.

Scriptable Dynamic Load Balancing

In the described embodiments, computer system 100 performs scriptable dynamic load balancing among processors, i.e., among cores 108-114 of CPU 102 and cores 118 of GPU 106. Generally, for dynamic load balancing, different types of loads (or portions thereof) are dynamically assigned to be executed on different processors. Here, "dynamically" indicates that the decision about where to assign the loads (or portions thereof) is made as the load is received in computer system 100 at runtime (as computer system 100 operates). In addition, "scriptable" load balancing indicates a script is executed to apply configurable rules to make the decision about where to assign loads. Thus, as a load is received, the script is executed based on the load and one or more other factors to determine where the load (or portions thereof) is to be executed in computer system 100. By using the script as described herein, the described embodiments reduce the overhead and complexity associated with implementing a dynamic load balancer in contrast to existing dynamic load balancers that do not use scripts.

Figure 2:
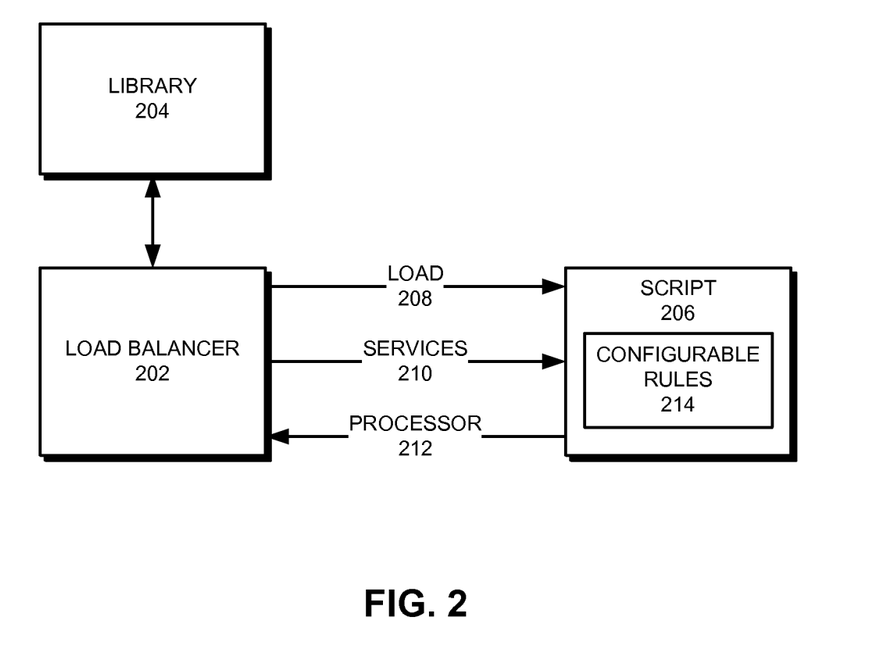
FIG. 2 presents a block diagram illustrating a system for executing a load in a computer system in accordance with some embodiments.

FIG. 2 presents a block diagram illustrating a system for performing scriptable dynamic load balancing in accordance with some embodiments. As shown in FIG. 2, the system includes a load balancer 202, library 204, and script 206. Load balancer 202 is software (program code, firmware, etc.) that executes on a processor in computer system 100 (e.g., one of cores 108-114) to perform operations associated with distributing loads among processors in computer system 100. In some embodiments, load balancer 202 is implemented in program code that is retrieved from a library 204 that is stored in memory 104 (or elsewhere in computer system 100, such as in a mass storage device). For example, in some embodiments, program code for load balancer 202 is included in a library such as AMD Core Math Library (ACML) from Advanced Micro Devices, Inc. of Sunnyvale, Calif., or from another library. In some embodiments, the operations associated with distributing loads performed by load balancer 202 include selecting processors for use in executing loads from high-performance computing (HPC), scientific, engineering, and/or other compute-intensive applications, such as loads for performing linear algebra, signal processing, and/or random number generation.

As mentioned above, the operation of load balancer 202 may be configured, adjusted, or otherwise influenced using configurable rules 214. In some embodiments, configurable rules 214 are obtained by loading script 206 from a mass-storage device (e.g., disk, large semiconductor memory, etc.) to memory 104. Load balancer 202 may then execute script 206 (or cause script 206 to be executed), e.g., on one of cores 108-114. While script 206 executes, load balancer 202 may provide a set of services 210 to script 206, and script may use services 210 (in combination with configurable rules 214, etc.) to select a processor 212 (e.g., one or more of cores 108-114, cores 118, etc.), for use in executing a load on computer system 100. Load balancer 202 may then receive the selected processor 212 and cause the load to be executed on processor 212.

More specifically, after script 206 has been loaded, load balancer 202 may obtain one or more attributes of the load and/or one or more characteristics of CPU 102, GPU 106, and/or other functional blocks or elements in computer system 100. For example, load balancer 202 may use library 204 and/or other information sources to identify a size of the load, a type of computation associated with the load, a dependency of the load, and/or other attributes of the load. Load balancer 202 may also obtain processor and/or computer system 100 characteristics such as a maximum memory allocation, a global memory size, a memory bandwidth, an operating frequency, a number of cores, a cache size, and/or a number of page faults. Load balancer 202 can then provide, to script 206, one or more properties of the load (i.e., as load 208).

Next, script 206 may use services 210 from load balancer 202 to apply configurable rules 214 to the attributes of the load and/or characteristics associated with CPU 102, GPU 106, and/or computer system 100. For example, script 206 may obtain the attributes and/or characteristics using one or more calls to library 204, load balancer 202, and/or other sources in computer system 100. Script 206 may then apply one or more thresholds, expressions, functions, equations, heuristics, and/or parameters from configurable rules 214 to the attributes and/or characteristics to obtain the selected processor 212 for use in executing the load.

Script 206 and/or load balancer 202 may use various other parameters in the selection of processor 212 for executing a given load. For example, configurable rules 214 may be applied to additional load attributes and/or hardware characteristics, such as matrix dimensions, matrix properties, matrix-operation properties, maximum work group dimension, and/or preferred work group size. Generally, script 206 and/or configurable rules 214 may utilize any query-able property provided by library 204 and/or another application-programming interface (API) accessible to load balancer 202 or script 206, including, but not limited to, hardware state and/or properties of a computation to be performed by executing the load.

Because configurable rules 214 are specified in script 206 and/or another data source accessible by the executing script 206, configurable rules 214 may be dynamically adapted to different types of loads, processors, and computer architectures in computer system 100. For example, an initial version of script 206 may include configurable rules 214 for selecting between CPU 102 and GPU 106 in executing loads on computer system 100. The configurable rules 214 from the initial version of script 206 (or another source) may be modified based on the numbers of cores in CPU 102, GPU 106, and/or other processors in computer system 100. Configurable rules 214 may further be modified to distribute different types of loads across multiple processors. Newer versions of script 206 may further be created to accommodate newly released or installed CPUs, GPUs, and/or other processors in computer system 100, load types, operating system and/or application parameters (for an operating system and/or application executing on computer system 100), etc. In some embodiments, script 206 can also be dynamically updated (i.e., during runtime of computer system 100), added to, or otherwise modified by replacing, removing, or adding to program code for script 206 and/or a file or library that includes program code for script 206.

Prior to selecting processor 212, load balancer 202 and/or script 206 may divide an original load into the load (i.e., a modified version of the original load) and one or more additional loads. For example, load balancer 202 and/or script 206 may divide a load for performing a mathematical computation on a large set of data (e.g., a matrix) into a number of smaller loads for performing the mathematical computation on smaller subsets of the data (e.g., sub-matrices). Script 206 may then assign each of the smaller loads to a processor for execution.

As with selection of processor 212 for use in executing a given load, configurable rules 214 may be used by load balancer 202 and/or script 206 to divide the original load into smaller loads. For example, configurable rules 214 may specify the division of various types and sizes of loads into smaller loads of pre-specified number or sizes. Such division of the original load into smaller loads may also be based on the dependencies of the original load, such as loads that cannot execute until the original load has finished executing, and/or other factors such as the type of load, the processors in computer system 100, etc. Configurable rules 214 may then be used to distribute the smaller loads across processors or processor cores of computer system 100.

After processor 212 is selected for use in executing a given load, load balancer 202 and/or another component of library 204 may cause the load to be executed on the selected processor 212. For example, load balancer 202 may bind a process or thread used to execute the load on the selected processor 212, may send one or more corresponding commands or requests to the selected processor 212, etc.

By using script 206 and configurable rules 214 to distribute loads across processors and/or processor cores in computer system 100, the operation of load balancer 202 may be dynamically configured during runtime instead of requiring a manual software update and/or recompiling code for load balancer 202 and/or library 204. Moreover, the flexibility of configurable rules 214 may be limited only by the functionality of the scripting language in which script 206 is written. For example, script 206 may include any number of expressions, functions, methods, operations, variables, thresholds/limits, values, etc. to be used in selecting processor 212. Script 206 may thus streamline the adaptation of load balancer 202 to different types of loads, types of processors, processor architectures, and/or computer architectures without rebuilding or releasing a new version of library 204. For example, a user may adapt configurable rules 214 to include heuristics for performing load balancing on computer system 100 after running tests that measure the performance of processors in computer system 100 with respect to certain types of loads. In turn, the user may improve execution of loads on computer system 100 without having to wait for a newer version of library 204 and/or load balancer 202 that accommodates the particular arrangement of processors or computer architecture of computer system 100. Consequently, the operation of load balancer 202 may be more flexible than that of a static load balancer and less complex to implement than that of a dynamic load balancer.

Updating of configurable rules 214 and/or script 206 may additionally be automated to improve execution of loads on computer system 100 over time. For example, tools may be created to run a set of benchmarks using configurable rules 214 and/or script 206, modify configurable rules 214 and/or script 206, and run the benchmarks using the modified versions. The tools may examine the difference in performance between the existing and modified versions and determine the appropriate next action to take. For example, the tools may utilize a genetic-programming technique to "evolve" configurable rules 214.

The system of FIG. 2 may also provide mechanisms for assisting users with updating configurable rules 214. For example, load balancer 202, library 204, and/or another component of the system may provide a graphical user interface (GUI) and/or other graphical representation of script 206 and/or configurable rules 214. The graphical representation may allow users who are uncomfortable or unfamiliar with scripting to create and/or combine configurable rules in a graphical fashion.

Configurable Rules

Figure 3:
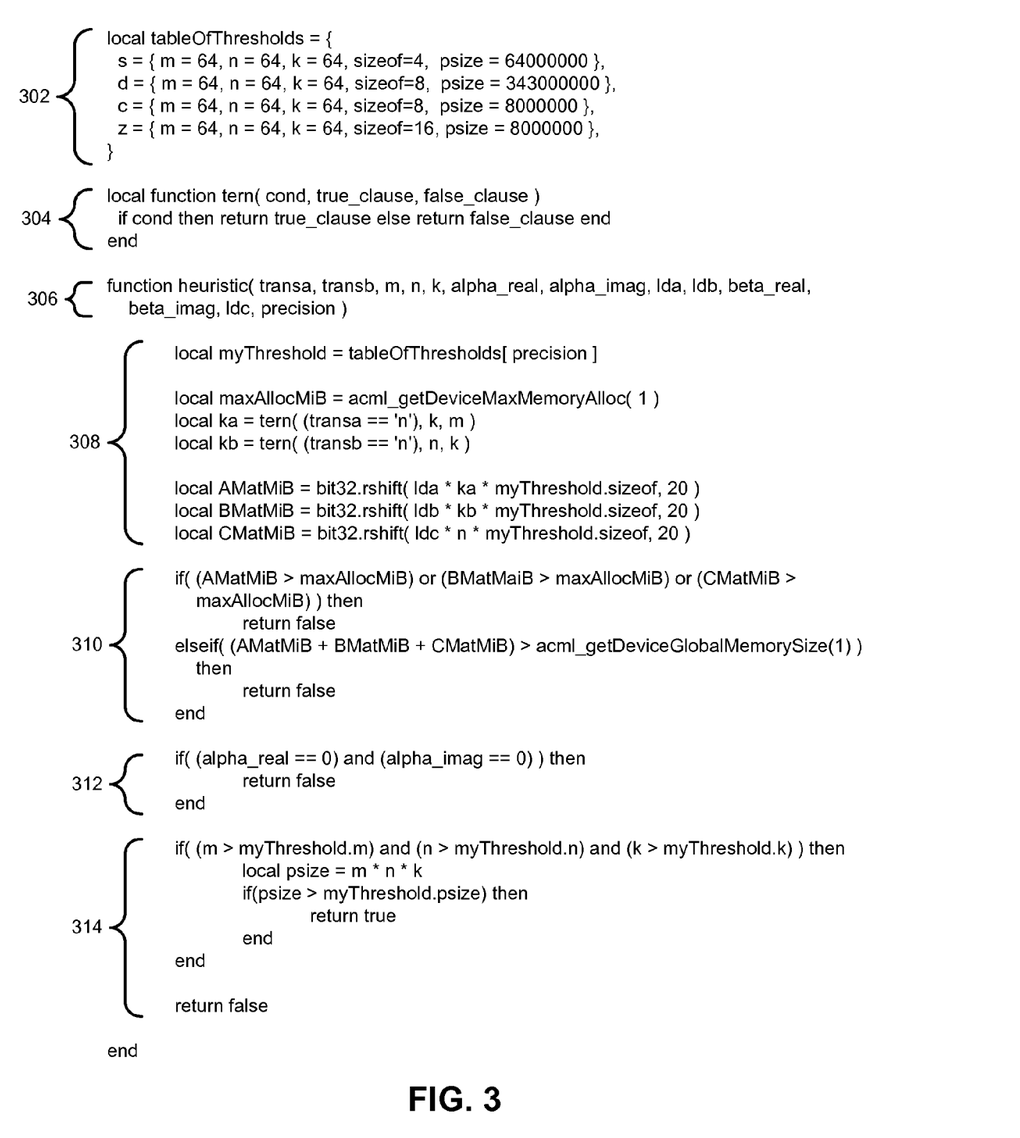
FIG. 3 presents a script in accordance with some embodiments.

FIG. 3 presents a block diagram illustrating a script 206 in accordance with some embodiments. As discussed above, script 206 may be loaded by load balancer 202 and executed. As shown in FIG. 3, in some embodiments, script 206 is written in the Lua scripting language and executed using a Lua interpreter that is incorporated into library 204, although other embodiments use other languages.

As shown in FIG. 3, script 206 includes a first portion 302 containing a table of thresholds (e.g., "local tableOfThresholds") to be used in selecting processor 212. Within the table, the variable "s" may represent single-precision constants, the variable "d" may represent double-precision constants, the variable "c" may represent single-precision complex constants, and the variable "z" may represent double-precision complex constants. Values of "m," "n," and "k" may specify thresholds for matrix dimensions related to a computation to be performed by executing the load, and "psize" may represent a total size associated with the computation and/or load.

Next, script 206 includes a portion 304 containing a local function named "tern" that simulates a ternary operator. The local function may accept three parameters, including a Boolean value named "cond" followed by a "true_clause" and a "false_clause." If "cond" is true, the local function returns the value of "true_clause." If "cond" is false, the local function returns the value of "false_clause."

Portion 304 is followed by a portion 306 containing a function header for a function named "heuristic," which analyzes a set of input parameters related to the load and selects processor 212 for use in executing the load by returning a Boolean expression based on the input parameters. The input parameters may be related to a matrix multiplication operation to be performed by executing the load. For example, the "heuristic" function may analyze parameters related to a matrix-matrix operation with the following form:

$$alpha*op(A)*op(B)+beta*C$$

In the matrix operation, op(X) is one of op(X)=X or op(X)=X', "alpha" and "beta" are scalars, and "A," "B," and "C" are matrices with dimensions of "m" by "k," "k" by "n," and "m" by "n," respectively.

Parameters of the "heuristic" function include "transa" and "transb," which specify the respective forms of matrices A and B to be used in a matrix multiplication associated with the load. The "transa" and "transb" variables may be strings with values of "n," "t," or "c." A value of "n" for "transa" or "transb" may result in op(X)=X for the corresponding matrix, while a value of "t" or "c" may result in op(X)=X' for the corresponding matrix. The parameters also include "m," "n" and "k," which specify the numbers of rows and columns of matrices A, B, and C as described above.

The "alpha_real," "alpha_imag," "beta_real," and "beta_imag" parameters represent the real and imaginary components of the "alpha" and "beta" scalars used in the matrix-matrix operation, respectively. The "lda," "ldb," and "ldc" variables specify the first dimensions of A, B, and C, respectively, as declared in a program calling the script, such as load balancer 202. When "transa" is set to the string "n," "lda" must be at least the value of parameter "1" or "m," whichever is greater. When "transa" is not set to the string "n," "lda" must be at least the value of parameter "1" or "k," whichever is greater. When "transb" is set to the string "n," "ldb" must be at least the value of parameter "1" or "k," whichever is greater. When "transb" is not set to the string "n," "ldb" must be at least the value of parameter "1" or "n," whichever is greater. The value of "ldc" must be at least the value of "1" or "m," whichever is greater.

Finally, the "precision" parameter is a string that represents the precision of the matrix-matrix operation. The string may be set to the value of "s," "d," "c" or "z" to correspond to the precisions of the thresholds in the table of portion 302.

After the function header of portion 306, the script 206 includes a portion 308 containing a set of variable declarations and assignments for use within the "heuristic" function. First, a variable named "myThreshold" may be initialized to the row of constants from "tableOfThresholds" in portion 302 that corresponds to the "precision" parameter of the "heuristic" function.

Next, a variable named "maxAllocMiB" may be set to the maximum memory allocation of an external device such as GPU 106. To obtain the value of "maxAllocMiB," a call may be made to an ACML library, which returns the maximum memory allocation in response to the call. Two variables named "ka" and "kb" may also be initialized using the "tern" function in portion 304. In particular, "ka" and "kb" may be set to the sizes of the second dimensions of the first and second matrices in the matrix-matrix operation, respectively, depending on whether the matrices are transposed or not. Finally, a set of variables named "AMatMiB," "BMatMiB," and "CMatMiB" may be used to calculate the sizes of the A, B, and C matrices, respectively, in megabytes.

After variables are set in portion 308, a portion 310 may be used to determine if the A, B, and C matrices can fit on memory in the processor, such as video memory 120 of GPU 106. Portion 310 may include a first "if" statement that compares each of the values of "AMatMiB," "BMatMiB," and "CMatMiB" to the maximum memory allocation of the processor. If any of the values exceed the maximum memory allocation, the "heuristic" function returns false to indicate that the load should be executed on CPU 102, since the external device is unable to allocate enough memory to store one or more of the matrices.

The "if" statement of portion 310 is followed by an "elseif" statement that compares the sum of the values of "AMatMiB," "BMatMiB," and "CMatMiB" to the global memory size of the external device. As with the maximum memory allocation of the external device, the global memory size may be obtained using a call to the ACML library. If the sum of the values (e.g., the sum of the sizes of the A, B, and C matrices) exceeds the global memory size, the "heuristic" function returns false to indicate that the load should be executed on CPU 102, since the external device lacks the memory to perform the matrix-matrix operation.

In portion 312, the script may determine, using "alpha_real" and "alpha_imag," if the "alpha" scalar of the matrix-matrix operation is zero. If "alpha" is zero, the matrix-matrix operation becomes a no-op, and the "heuristic" function returns false to indicate that the load should be executed on CPU 102. By performing the no-op on CPU 102, overhead associated with unnecessarily transferring data associated with the matrix-matrix operation to the external device is averted.

The last portion 314 of the "heuristic" function is used to determine if the load should be executed on the external device. Portion 314 includes an "if" statement that compares the "m," "n," and "k" dimensions of the matrices in the matrix-matrix operation with the corresponding thresholds from the table in portion 304. As described above, the thresholds may be set according to the value of the "precision" parameter. If all three dimensions are greater than their corresponding thresholds, a local variable "psize" is calculated as the product of the three dimensions. The value of "psize" is then compared to the corresponding threshold for "psize," and true is returned if "psize" is greater than the threshold to indicate that the load should be executed on the external device. If "psize" is not greater than the threshold, false is returned to indicate that the load should be executed on CPU 102.

In other words, an external processor such as GPU 106 may be selected for use in executing a load for performing the matrix-matrix operation if the size of the load and/or one or more matrix dimensions associated with the operation exceed one or more thresholds without exceeding the maximum memory allocation or global memory size of the external processor. The thresholds and the "heuristic" function may be modified to accommodate different types of processors, numbers of processors or processor cores, operating frequencies, computations associated with loads to be executed on computer system 100, and/or dependencies of the loads. For example, a different version of the "heuristic" function may be added to script 206 to select a processor or processor core for executing a load related to numerical optimization, signal processing, and/or machine learning. The updated script 206 may then be executed by load balancer 202 during runtime of load balancer 202, thus changing the behavior of load balancer 202 without requiring recompiling or reloading of load balancer 202.

Executing of a Load on a Computer System

Figure 4:
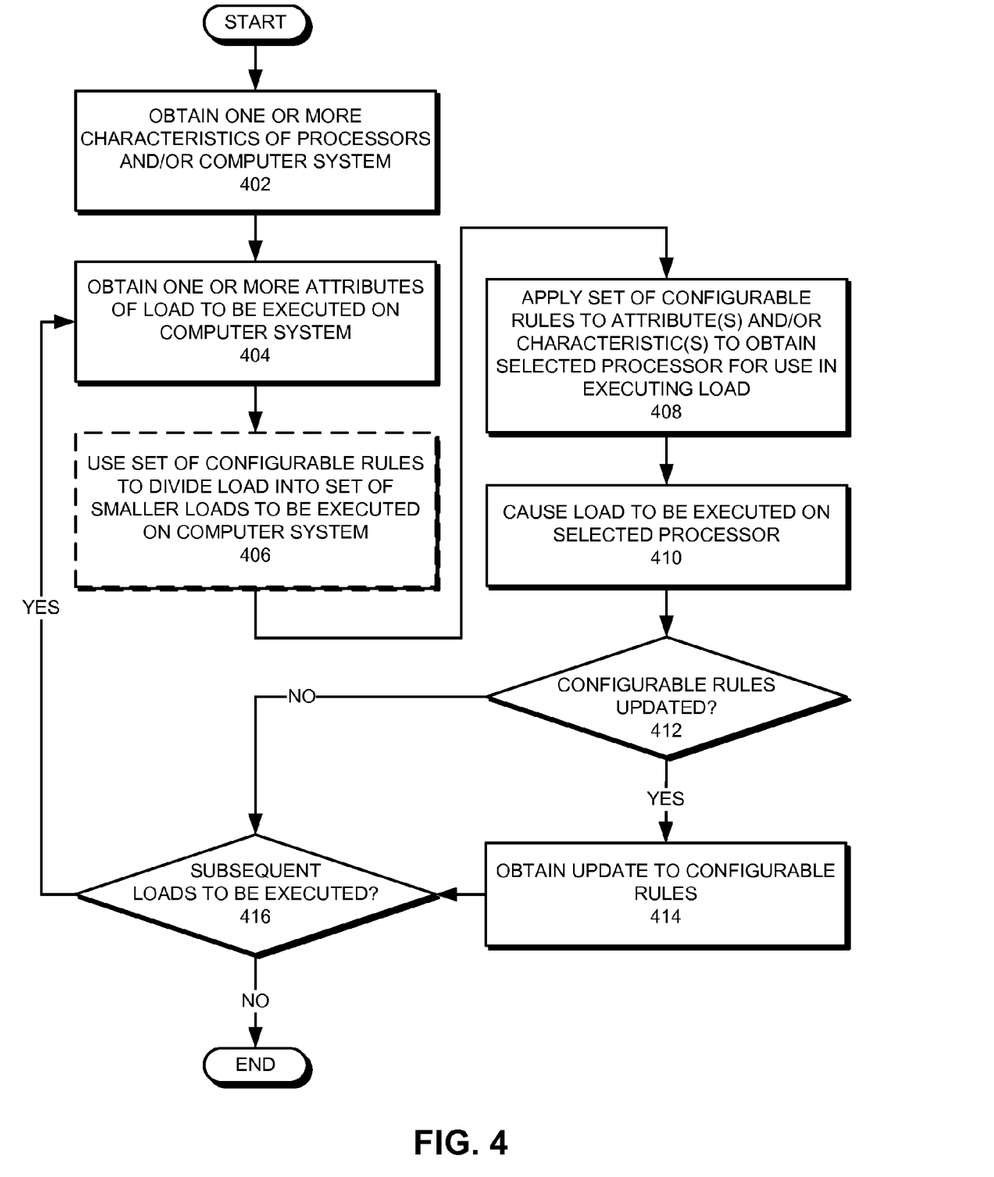
FIG. 4 presents a flowchart illustrating a process of executing a load using a first processor and a second processor in a computer system in accordance with some embodiments.

FIG. 4 presents a flowchart illustrating the process for executing a load using a first processor and a second processor in a computer system in accordance with some embodiments. In one or more embodiments, one or more of the steps may be omitted, repeated, and/or performed in a different order. Accordingly, the specific arrangement of steps shown in FIG. 4 should not be construed as limiting the scope of the embodiments. Additionally, although certain mechanisms are used in describing the operations (e.g., CPU 102, load balancer 202, library 204, computer system 100, etc.), in some embodiments, other mechanisms perform the operations.

Initially, load balancer 202 obtains one or more characteristics of the processors and/or computer system 100 (operation 402). For example, load balancer 202 may make one or more calls to library 204 to obtain the characteristics. The characteristics may include a maximum memory allocation, a global memory size, a memory bandwidth, an operating frequency, a number of cores, a cache size, a number of page faults, and/or other values related to the hardware state of computer system 100.

Load balancer 202 may also obtain one or more attributes of a load to be executed on computer system 100 (operation 404). The attributes may include a size of the load, a type of computation associated with the load, operations to be performed for processing the load, and/or a dependency of the load.

Next, load balancer 202 may optionally use a set of configurable rules to divide the load into a set of smaller loads to be executed on computer system 100 (operation 406). For example, load balancer 202 may run a script (e.g., script 206 of FIG. 2) and obtain the configurable rules (e.g., configurable rules 214 of FIG. 2) from the script. The configurable rules may identify different types and sizes of original loads, as well as the number and/or sizes of smaller loads into which the original loads are to be divided. Load balancer 202 and/or script 206 may pass the attribute(s) of the load and/or characteristic(s) of computer system 100 as parameters to one or more functions, and the functions may use the configurable rules to return one or more values for dividing an original load into a set of smaller loads. The value(s) may include the number, size, and/or content of the smaller loads. Load balancer 202 may then use the returned value(s) to divide the original load into the smaller loads.

To enable execution of each load, load balancer 202 and/or script 206 may apply the set of configurable rules to the attribute(s) and/or characteristic(s) to obtain a selected processor for use in executing the load (operation 408). As with dividing the original load into smaller loads, load balancer 202 and/or script 206 may pass the attribute(s) of the load and/or characteristic(s) of computer system 100 as parameters to one or more functions containing the configurable rules. The function(s) may use the configurable rules to return one or more values for specifying the selected processor and/or processor core for use in executing the load. For example, the function(s) may apply one or more thresholds related to a maximum memory allocation, a global memory size, a matrix dimension, and/or a total size of a matrix-matrix operation to determine if the matrix-matrix operation should be performed on a CPU or a GPU.

Load balancer 202 may then cause the load to be executed on the selected processor (operation 410) or processor core. For example, load balancer 202 may bind a process or thread used to execute the load to one or more selected cores of CPU 102 and/or send a request or command to the selected processor.

The configurable rules may be updated (operation 412) during runtime of computer system 100 (although perhaps not during the actual runtime of script 206). For example, the configurable rules may be updated by a user and/or a tool that "evolves" the configurable rules based on benchmarks run against existing versions of the configurable rules. If the configurable rules have been updated, the update is obtained (operation 414). For example, the update may be obtained in a newer version of a script containing the configurable rules. To apply the update, a previous version of the script may be replaced with the newer version, and the newer version may be executed by load balancer 202 for use in selecting a processor for execution of subsequent loads on computer system 100.

Subsequent loads may be executed (operation 416) on computer system 100. For example, the subsequent loads may be scheduled for execution through function calls to library 204, such as ACML or OpenCL. The subsequent loads may also include additional smaller loads into which a load was divided during operation 406. If subsequent loads are to be executed, load balancer 202 may obtain one or more attributes of each load (operation 404) and optionally use the configurable rules to divide the load into a set of smaller loads (operation 406). Load balancer 202 may then apply the configurable rules to the attribute(s) of the load and/or characteristic(s) of the processors and/or computer system 100 to obtain a selected processor for use in executing the load. Finally, load balancer 202 may cause the load to be executed on the selected processor (operation 410). Such distribution of loads across processors and/or processor cores may continue indefinitely (i.e., as long as computer system 100 is executing corresponding loads).

In some embodiments, a computer system (e.g., computer system 100 in FIG. 1 and/or some portion thereof) uses code and/or data stored on a non-transitory computer-readable storage medium to perform some or all of the operations herein described. More specifically, the computer system reads the code and/or data from the computer-readable storage medium and executes the code and/or uses the data when performing the described operations.

A computer-readable storage medium can be any device or medium or combination thereof that stores code and/or data for use by a computer system. For example, the computer-readable storage medium can include, but is not limited to, volatile memory or non-volatile memory, including flash memory, random access memory (eDRAM, RAM, SRAM, DRAM, DDR, DDR2/DDR3/DDR4 SDRAM, etc.), read-only memory (ROM), and/or magnetic or optical storage mediums (e.g., disk drives, magnetic tape, CDs, DVDs).

In some embodiments, one or more hardware modules are configured to perform the operations herein described. For example, the hardware modules can comprise, but are not limited to, one or more processors/cores/central processing units (CPUs), application-specific integrated circuit (ASIC) chips, field-programmable gate arrays (FPGAs), caches/cache controllers, memory management units, compute units, embedded processors, graphics processors (GPUs)/graphics cores, pipelines, Accelerated Processing Units (APUs), and/or other programmable-logic devices. When such hardware modules are activated, the hardware modules perform some or all of the operations. In some embodiments, the hardware modules include one or more generalpurpose circuits that are configured by executing instructions (program code, firmware, etc.) to perform the operations.

In some embodiments, a data structure representative of some or all of the structures and mechanisms described herein (e.g., computer system 100 and/or some portion thereof) is stored on a non-transitory computer-readable storage medium that includes a database or other data structure which can be read by a computer system and used, directly or indirectly, to fabricate hardware comprising the structures and mechanisms. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates/circuit elements from a synthesis library that represent the functionality of the hardware comprising the above-described structures and mechanisms. The netlist may then be placed and routed to produce a data set describing geometric shapes to be applied to masks. The masks may then be used in various semiconductor fabrication steps to produce a semiconductor circuit or circuits corresponding to the above-described structures and mechanisms. Alternatively, the database on the computer accessible storage medium may be the netlist (with or without the synthesis library) or the data set, as desired, or Graphic Data System (GDS) II data.

In this description, functional blocks may be referred to in describing some embodiments. Generally, functional blocks include one or more interrelated circuits that perform the described operations. In some embodiments, the circuits in a functional block include circuits that execute program code (e.g., microcode, firmware, applications, etc.) to perform the described operations.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. A method for executing a load in a computer system that includes a plurality of processors, the method comprising:
   obtaining, by a load balancer executing in a first processor of the plurality of processors, one or more attributes of a load to be executed on the computer system;
   executing, by the load balancer, a script that comprises one or more expressions in a corresponding scripting language, wherein executing the script includes executing the one or more expressions based at least in part on the one or more attributes and receiving, as a result of executing the one or more expressions, an output value that identifies a selected processor from among the plurality of processors for executing the load; and
   executing the load on the selected processor.

2. The method of claim 1, further comprising:
   dynamically obtaining an update for the script and applying the update to generate an updated script; and
   executing, by the load balancer, the updated script to determine an additional selected processor from among the plurality of processors for executing a subsequent load on the computer system.

3. The method of claim 1, further comprising:
   obtaining, by the load balancer, one or more characteristics of at least one of the plurality of processors and the computer system;
   wherein executing the script further includes executing the one or more expressions based at least in part on the one or more characteristics.

4. The method of claim 1, further comprising:
   executing one or more load-division expressions in the script based on one or more attributes of an original load to determine a division of the original load into the load and at least one additional load.

5. The method of claim 1, wherein the one or more attributes of the load comprise at least one of:
   a size of the load;
   a type of computation associated with the load; and
   a dependency of the load.

6. The method of claim 1, wherein executing the load comprises:
   transferring data to be used during executing the load to the selected processor.

7. The method of claim 1, wherein the one or more expressions comprise at least one expression in which one or more thresholds are applied to the one or more attributes.

8. The method of claim 1, wherein at least two of the plurality of processors have different architectures.

9. A computer system, comprising:
   a plurality of processors,
   wherein a first processor from the plurality of processors performs operations for executing a load balancer, the operations comprising:
      obtaining one or more attributes of a load to be executed on the computer system;
      executing a script that comprises one or more expressions in a corresponding scripting language, wherein executing the script includes executing the one or more expressions based at least in part on the one or more attributes and receiving, as a result of executing the one or more expressions, an output value that identifies a selected processor from among the plurality of processors for executing the load; and
      executing the load on the selected processor.

10. The computer system of claim 9, wherein the first processor further performs operations comprising:
    dynamically obtaining an update for the script and applying the update to generate an updated script; and
    executing the updated script to determine an additional selected processor from among the plurality of processors for executing a subsequent load on the computer system.

11. The computer system of claim 9, wherein the first processor further performs operations comprising:
    obtaining one or more characteristics of at least one of the plurality of processors and the computer system;
    wherein executing the script further includes executing the one or more expressions based at least in part on the one or more characteristics.

12. The computer system of claim 9, wherein the first processor further performs operations comprising:
    executing one or more load-division expressions in the script based on one or more attributes of an original load to determine a division of the original load into the load and at least one additional load.

13. The computer system of claim 9, wherein the one or more expressions comprise at least one expression in which one or more thresholds are applied to the one or more attributes.

14. A non-transitory computer-readable storage medium storing instructions that, when executed by a computer system that includes a plurality of processors, cause the computer system to perform a method for executing a load, the method comprising:
- obtaining one or more attributes of a load to be executed on the computer system;
- executing a script that comprises one or more expressions in a corresponding scripting language, wherein executing the script includes executing the one or more expressions based at least in part on the one or more attributes and receiving, as a result of executing the one or more expressions, an output value that identifies a selected processor from among the plurality of processors for executing the load; and
- executing the load on the selected processor.

15. The non-transitory computer-readable storage medium of claim 14, wherein the method further comprises:
- dynamically obtaining an update for the script and applying the update to generate an updated script; and
- executing, by the load balancer, the updated script to determine an additional selected processor from among the plurality of processors for executing a subsequent load on the computer system.

16. The non-transitory computer-readable storage medium of claim 14, wherein the method further comprises:
- obtaining one or more characteristics of at least one of the plurality of processors and the computer system;
- wherein executing the script further includes executing the one or more expressions based at least in part on the one or more characteristics.

17. The non-transitory computer-readable storage medium of claim 14, wherein the method further comprises:
- executing one or more load-division expressions in the script based on one or more attributes of an original load to determine a division of the original load into the load and at least one additional load.

* * * * *